United States Patent
Pitschke

(10) Patent No.: US 9,582,606 B2
(45) Date of Patent: *Feb. 28, 2017

(54) VALIDATION OF SCHEMA AND SCHEMA CONFORMANCE VERIFICATION

(75) Inventor: Steven B. Pitschke, Wellesley, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 393 days.

This patent is subject to a terminal disclaimer.

(21) Appl. No.: 13/553,045

(22) Filed: Jul. 19, 2012

(65) Prior Publication Data

US 2013/0007070 A1 Jan. 3, 2013

Related U.S. Application Data

(63) Continuation of application No. 13/172,901, filed on Jun. 30, 2011.

(51) Int. Cl.
*G06F 17/30* (2006.01)
*G06F 7/00* (2006.01)

(52) U.S. Cl.
CPC .. *G06F 17/30908* (2013.01); *G06F 17/30914* (2013.01)

(58) Field of Classification Search
CPC .............. G06F 17/30908; G06F 17/30914
USPC ........................................................ 707/803
See application file for complete search history.

(56) References Cited

U.S. PATENT DOCUMENTS

| | | | |
|---|---|---|---|
| 6,832,219 B2 | 12/2004 | Lal | |
| 7,107,574 B1 * | 9/2006 | Nedbal | G06F 9/44505 717/120 |
| 7,134,072 B1 | 11/2006 | Lovett et al. | |
| 7,168,077 B2 | 1/2007 | Kim et al. | |
| 7,318,063 B2 | 1/2008 | Brychell et al. | |
| 7,600,685 B2 | 10/2009 | Alleshouse | |
| 2003/0145047 A1 * | 7/2003 | Upton | G06F 9/541 709/203 |
| 2003/0163603 A1 * | 8/2003 | Fry et al. | 709/328 |
| 2005/0060317 A1 * | 3/2005 | Lott et al. | 707/10 |
| 2005/0177543 A1 * | 8/2005 | Chen | G06F 17/2229 |
| 2005/0246159 A1 * | 11/2005 | Perla et al. | 704/8 |
| 2006/0004827 A1 * | 1/2006 | Stuart | G06F 9/4425 |
| 2007/0043702 A1 * | 2/2007 | Lakshminarayanan et al. | 707/3 |
| 2007/0112851 A1 | 5/2007 | Tomic et al. | |
| 2007/0266380 A1 | 11/2007 | Creamer et al. | |

(Continued)

OTHER PUBLICATIONS

DTD and Schema Validator—Check for XML grammar. https://web.archive.org/web/20110424124411/http://www.validome.org/grammar/. Apr. 24, 2011. 1 page.*

(Continued)

*Primary Examiner* — Kimberly Wilson
(74) *Attorney, Agent, or Firm* — Cuenot, Forsythe & Kim, LLC

(57) ABSTRACT

Within a system comprising a processor and a memory, a method that includes, via the processor, receiving a schema as an input. For each element in the schema, the method can include parsing the element from the schema, validating the parsed element, generating a parse tree node for the parsed element, and adding the parse tree node to a schema parse tree. The method further can include outputting the schema parse tree.

11 Claims, 5 Drawing Sheets

(56) References Cited

U.S. PATENT DOCUMENTS

| | | | | |
|---|---|---|---|---|
| 2007/0288890 | A1* | 12/2007 | Wells | G06F 8/38 |
| | | | | 717/113 |
| 2008/0104105 | A1* | 5/2008 | Heifets et al. | 707/102 |
| 2008/0216052 | A1* | 9/2008 | Hejlsberg et al. | 717/114 |
| 2009/0254812 | A1 | 10/2009 | Vion-Dury et al. | |
| 2010/0023471 | A1* | 1/2010 | Baldwin et al. | 706/47 |
| 2010/0228764 | A1* | 9/2010 | Sallakonda et al. | 707/769 |

OTHER PUBLICATIONS

Kostoulas, M.G., et al., "XML Screamer: An integrated approach to high performance XML parsing, validation and deserialization," Proceedings of the 15th International Conference on World Wide Web, WWW'06, Dec. 1, 2006, pp. 93-102.

Gao, Z., et al., "A high performance schema-specific XML parser," Proceedings—e-Science 2007, 3rd IEEE International Conference on e-Science and Grid Computing, IEEE P3064, pp. 245-252, Jan. 1, 2007.

Zhang, W., et al., "A Table-Driven Streaming XML Parsing Methodolory for High-Performance Web Services," IEEE Computer Society, IEEE International Conference on Web Services (ICWS'06), 2006.

Barbosa, D. et al., "Efficient Incremental Validation of XML Documents," The Computer Society, Proceedings of the 20th International Conference on Data Engineering (ICDE'04), IEEE, 2004.

Budimir, G., et al., "Quality control system of XML bibliographic records," Novi Sad J. Math, vol. 34, No. 1, pp. 107-130, 2004.

\* cited by examiner

VALIDATION OF SCHEMA AND SCHEMA CONFORMANCE VERIFICATION

CROSS-REFERENCE TO RELATED APPLICATIONS

This application is a Continuation of U.S. application Ser. No. 13/172,901, filed on Jun. 30, 2011.

BACKGROUND

The embodiments disclosed within this specification relate to validation of a schema that itself is used to validate one or more document instances.

The use of XML messages to relay information, especially via Internet based protocols, is prevalent. Essentially, an XML message is an XML document communicated via a suitable communication medium. With the proliferation of XML, and the increased complexity Internet communications, XML messages also are becoming increasingly complex.

XML schema oftentimes are used to specify the content of XML documents. An XML schema is a description of a type of XML document, typically expressed in terms of constraints on the structure and content of documents of that type, above and beyond the basic syntactical constraints imposed by XML itself. In illustration, XML schema generally are expressed using some combination of grammatical rules governing the order of elements, Boolean predicates that the content must satisfy, data types governing the content of elements and attributes, etc.

BRIEF SUMMARY

One embodiment of the present invention relates to, within a system comprising a processor and a memory, a method that includes, via the processor, receiving a schema as an input. For each element in the schema, the method can include parsing the element from the schema, validating the parsed element, generating a parse tree node for the parsed element, and adding the parse tree node to a schema parse tree. The method further can include outputting the schema parse tree.

Another embodiment of the present invention relates to, within a system comprising a processor and a memory, a method that includes, via the processor, receiving a document instance as an input. For each element in the document instance, the method can include parsing the element from the document instance and performing a first validation of each parsed element using a schema parse tree. The method further can include performing a second validation of at least one parsed element using at least one user defined rule. The validated document elements can be added to a validation report, and the validation report can be output.

Yet another embodiment of the present invention can include a computer program product including a computer-readable storage medium having computer-usable program code that, when executed, causes a machine to perform the various steps and/or processes described herein.

DETAILED DESCRIPTION

Figure 1:
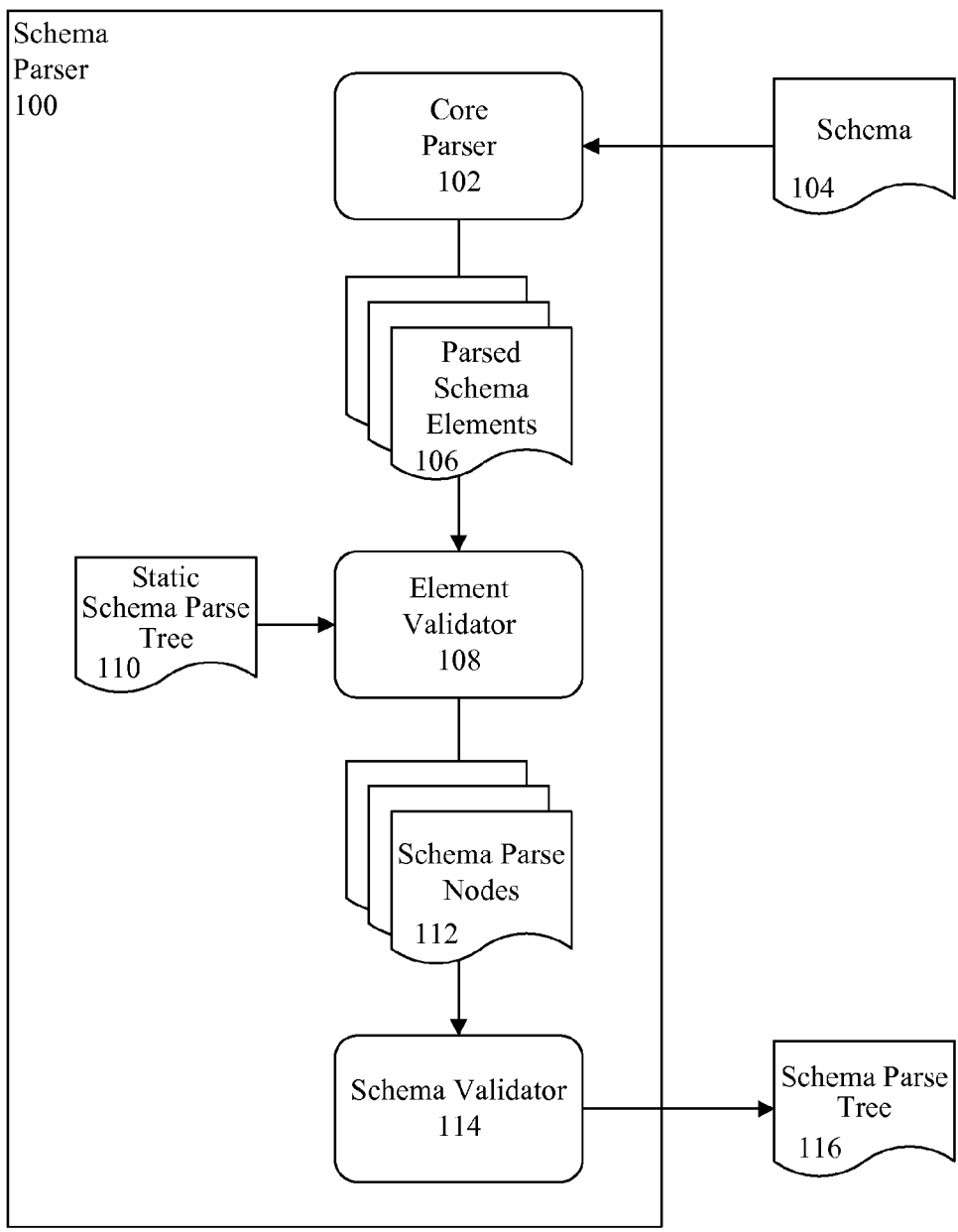
FIG. 1 is a block diagram illustrating a schema parser in accordance with one embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The present invention relates to the use of a schema to validate a document. More particularly, the present invention uses validation to determine whether schema for a set of documents is a valid schema, and to determine whether the instances of documents that purport to conform to both the schema and user defined validation rules actually do.

FIG. 1 is a block diagram illustrating a schema parser 100 in accordance with one embodiment of the present invention. The schema parser 100 can include a core parser 102. The core parser 102 can receive schema 104, parse the schema elements from the schema 104, and output the parsed schema elements 106. The schema 104 can be extensible markup language (XML) schema. In this regard, the core parser 102 can be an XML parser, such as a document object model (DOM) parser, though this need not the case.

As used herein, the term "schema" means data that describes a structure of a document. For example, XML schema can describe the structure of an XML document. The schema 104 can define elements that can appear in a document, attributes that can appear in a document, which elements are child elements, the order of child elements, the number of child elements, whether an element is empty or can include text, data types for elements and attributes, and default and fixed values for elements and attributes. Still, the Schema 104 can define other structural elements within a document and the invention is not limited in this regard. Further, the schema 104 itself may be presented to the core parser 102 in the form of a schema document, for example as an XML schema document.

The parsed schema elements 106 can be passed from the core parser 102 to an element validator 108, which validates the parsed schema elements 106 and generates schema parse nodes 112. To validate the parsed schema elements 106, the element validator 108 can access a static schema parse tree 110 and compare the parsed schema elements 106 to nodes within the static schema parse tree 110. In illustration, for each parsed schema element 106, the element validator 108 can navigate the static schema parse tree 110 to identify a node corresponding to the parsed schema element 106. In this regard, the static schema parse tree 110 can include a node for each type of schema element expected to be encountered in schema 104.

The element validator 108 can determine whether the parsed schema element 106 is configured in accordance with the identified node. For example, the element validator 108 can determine whether the parsed schema element 106 matches the grammatical rules, Boolean predicates, content, data types, etc. defined by the identified node. If not, the element validator can trigger an exception. The exception can be processed by a system to generate an alert to a user, output an error message, or the like. In one arrangement, the element validator 108 can provide an identifier for the parsed schema element 106 that does not conform to the static schema parse tree 110, and this identifier can be presented in a schema parse tree 116, which will be discussed herein. The element validator 108 can process the parsed schema elements 106 to generate for each parsed schema element 106 a schema parse node 112. The element validator 108 can configure the structure of each schema parse node 112 to correspond to the node of the static schema parse tree 110 identified for the schema parse node 112.

At a low-level, the element validator 108 can utilize a class, which may be called, for example, "ParseNode," that defines the schema parse nodes 112. In this regard, the ParseNode class can be abstract with respect to the schema 104. The ParseNode class can include one or more subclasses, for example a class (e.g., an "AttributeNode" class) that defines particle attributes for the schema parse nodes 112 and a class (e.g., an "ElementNode" class) that defines particle elements for the schema parse nodes 112. The AttributeNode and ElementNode classes can be more specialized than conventional attributes and elements (e.g., XML attributes and elements). For example, the AttributeNode and ElementNode classes can comprise properties that correspond to how the schema uses XML to specify an XML document type.

The schema parse nodes 112 can be passed from the element validator 108 to a schema validator 114. The schema validator 114 can assemble the schema parse nodes 112 into a schema parse tree 116, and output the schema parse tree 116. The structure of the schema parse tree itself can represent the syntactical rules defined by the XML Schema. The schema parse tree 116 can be used by the system to validate document instances, as will be described herein.

Figure 2:
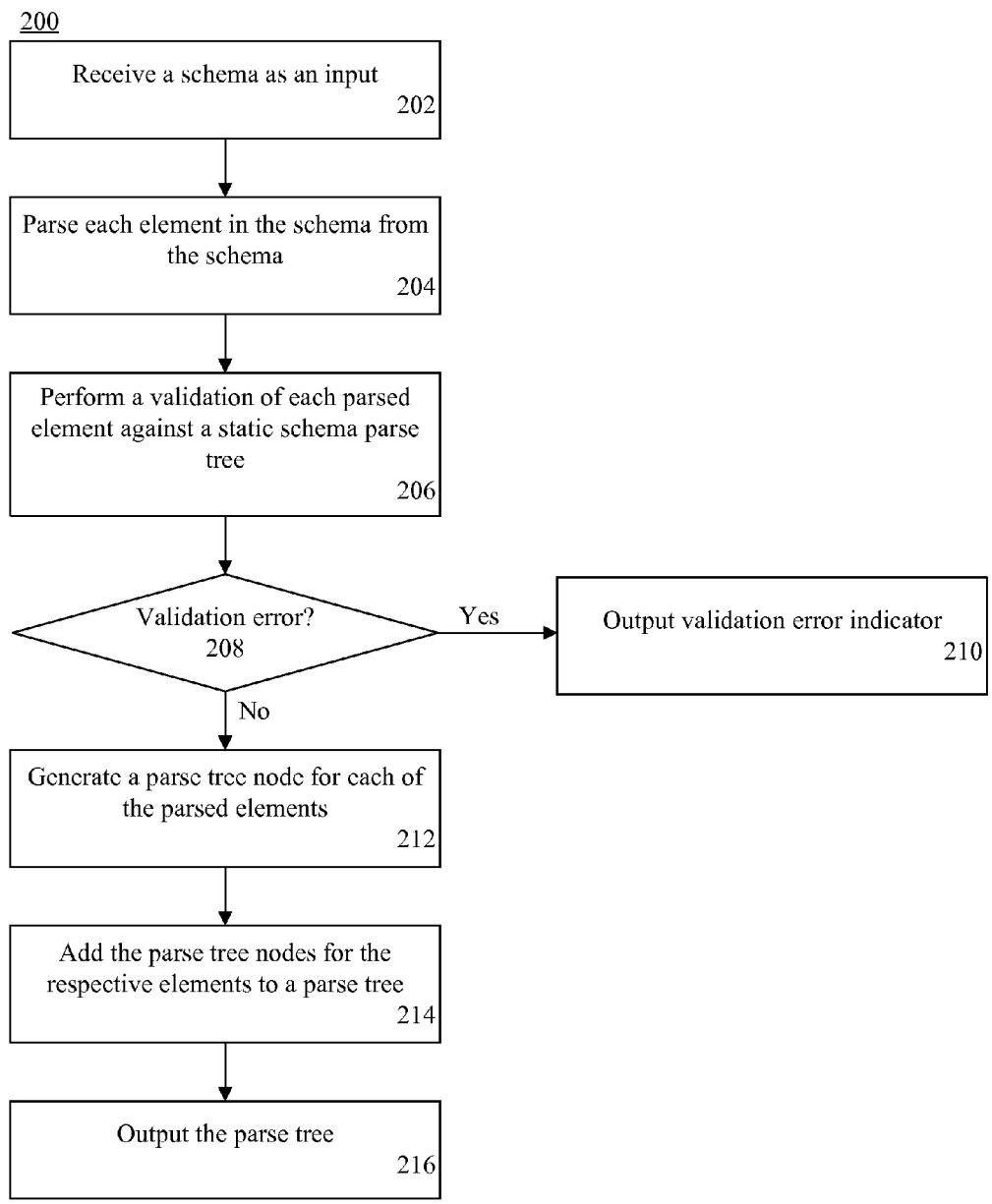
FIG. 2 is a flowchart illustrating an method of validating schema in accordance with one embodiment of the present invention.

FIG. 2 is a flowchart illustrating a method 200 of validating schema in accordance with one embodiment of the present invention. At step 202, a schema can be received as an input. At step 204, each element in the schema can be parsed from the schema. At step 206, each parsed element can be validated. For example, each parsed element can be validated against a static schema parse tree. At decision box 208, a determination can be made as to whether a validation error occurred. A validation error can occur when one or more of the parsed elements do not properly correlate to the corresponding static schema parse tree. In illustration, a validation error can be generated if the parsed element does not correspond to the grammatical rules, Boolean predicates, content, data types, etc. defined by the corresponding static parse tree node, or a parsed element does not have a corresponding node in the static parse tree. If a validation error occurs, at step 210 a validation error indicator can be output. For example, a message can be presented to a user via a user interface of the system on which the validation is being performed.

If a validation error does not occur, at step 212 a parse tree node can be generated for each of the parsed elements. At step 214, each of the parse tree nodes can be added to a parse tree. At step 216, the parse tree can be output.

Figure 3:
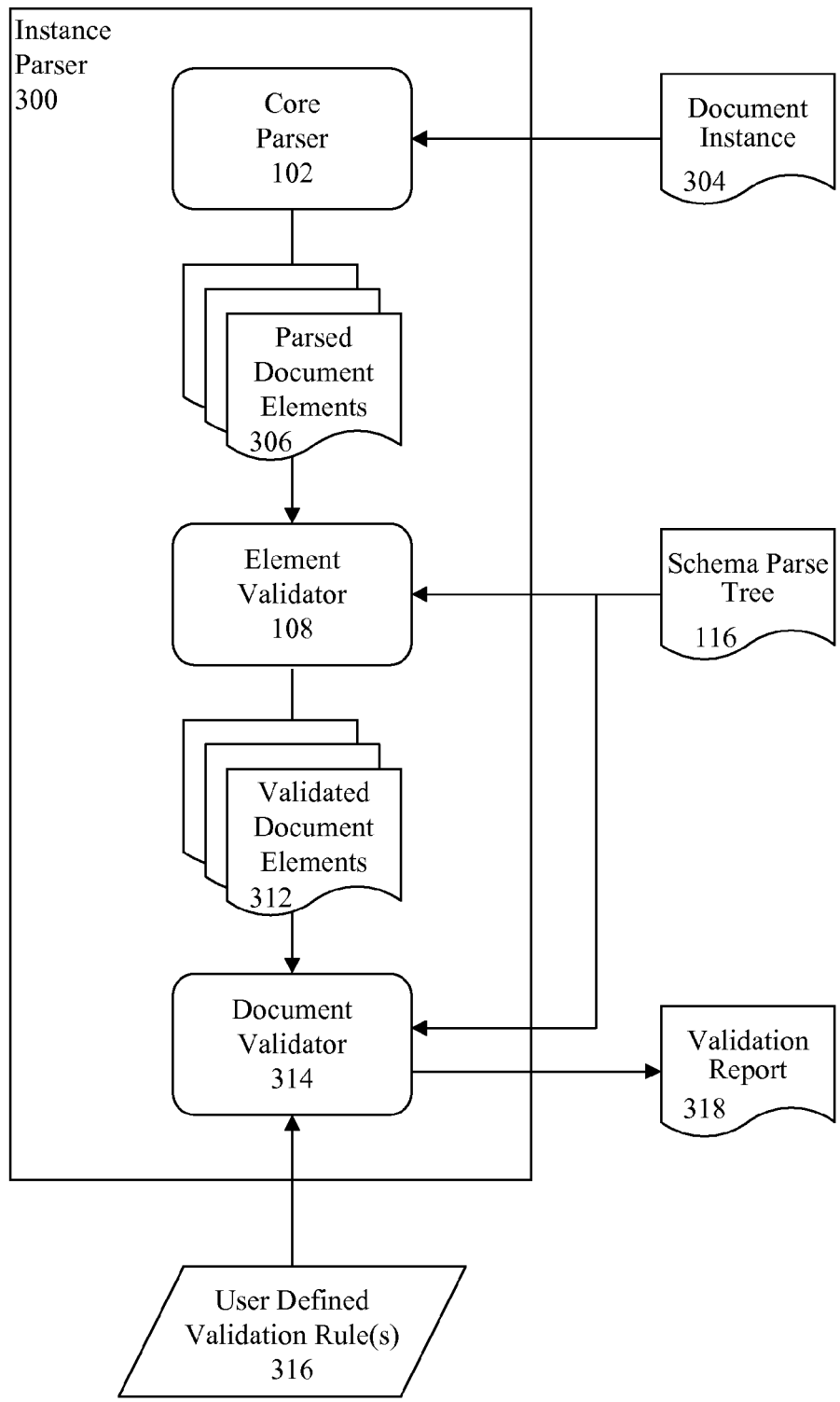
FIG. 3 is a block diagram illustrating an instance parser in accordance with one embodiment of the present invention.

FIG. 3 is a block diagram illustrating an instance parser 300 in accordance with one embodiment of the present invention. The instance parser 300 can share the core parser 102 and the element validator 108 previously described with reference to FIG. 1. In illustration, the core parser 102 and element validator 108 can be implemented as functions or objects that are utilized both the schema parser 100 and the instance parser 300.

The core parser 102 can receive at least one document instance 304, parse the document elements from the document instance 304, and output the parsed document elements 306. The document instance 304 can be an XML document to be validated. The parsed document elements 306 can be passed from the core parser 102 to the element validator 108, which validates the document elements 306 and generates validated document elements (hereinafter "document elements") 312. To validate the parsed document elements 306, the element validator 108 can access the schema parse tree 116 output by the schema parser 100 of FIG. 1, and compare the parsed document elements 306 to nodes within the schema parse tree 116. In illustration, for each parsed document element 306, the element validator 108 can navigate the schema parse tree 116 to identify a node corresponding to the parsed document element 306. In this regard, the schema parse tree 116 can include a node for each type of document element expected to be encountered in the document instance 304.

The element validator 108 can determine whether the parsed document element 306 is configured in accordance with the identified node. For example, the element validator 108 can determine whether the parsed document element 306 matches corresponds to the grammatical rules, Boolean predicates, content, data types, etc. defined by the identified node. If not, the element validator can trigger an exception. The exception can be processed by a system to generate an alert to a user, output an error message, or the like. In one arrangement, the element validator 108 can provide an identifier for the parsed document element 306 that does not conform to the schema parse tree 116, and this identifier can be presented in a validation report 318, which will be discussed herein. The element validator 108 can process the parsed document elements 306 to generate for each parsed document element 306 a validated document element 312.

The element validator 108 can configure the structure of each document element 312 to correspond to the node of the schema parse tree 116 identified for the document element 312.

As noted, the element validator 108 can utilize a class, which may be called, for example, "ParseNode." In the instance parser 300, the ParseNode class can define the validated document elements 312. In illustration, the AttributeNode class can define particle attributes for the validated document elements 312 and the ElementNode class can define particle elements for the validated document elements 312.

The document elements 312 can be passed from the element validator 108 to a document validator 314. The document validator 314 can perform an additional validation of the document elements 312. Specifically, the document validator 314 can validate such document elements 312 to determine whether the document elements 312 conform to user defined validation rules 316. In illustration, certain nodes of the schema parse tree 116 can contain syntax that calls one or more of the user defined validation rules 316. When a document element 312 corresponds to a node of the schema parse tree 116 that includes such syntax, the syntax can trigger the document validator 314 to access a corresponding user defined validation rule 316. For example, the document instance 304 can be passed to the instance parser 300 within the context of a JUnit test case test. Part of the implementation of the JUnit test can be a subclass of the instance parser 300 that contains logic implementing the user defined validation rules 316.

The user defined validation rules 316 can define acceptable parameters and/or logic to validate certain types of data that may be contained in the document elements 312. In this regard, the user defined validation rules 316 can be abstracted from the schema, but called by the schema when needed. For example, if a document element contains data identifying a part number for merchandise, a user defined validation rule 316 can define acceptable attributes for the part number, such as acceptable alphanumeric text, numeric ranges, etc. The user defined validation rules 316 also can implement other types of business logic.

Because each instance of a document can be validated, aspects of the document that may change each time a new instance of the document is generated can be validated. For example, the document can reference a part number being ordered, and the same document can be used for a plurality of different orders. Accordingly, the part number can change from one order to another. Thus, with each new instance of the document being generated, the part number can be validated against the user defined validation rules 316 to ensure that the part number is a valid part number, or otherwise corresponds to a valid part number format. Still, other logic (e.g., business logic) can be applied by the user defined validation rules 316 and the invention is not limited in this regard.

Figure 4:
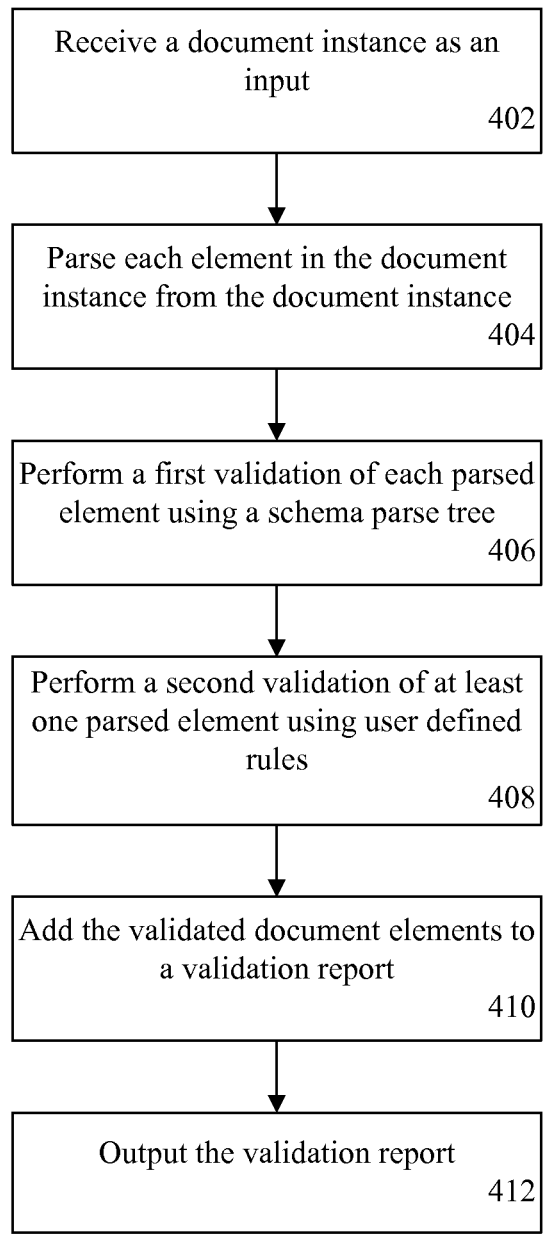
FIG. 4 is a flowchart illustrating an method of validating a document instance in accordance with one embodiment of the present invention.

FIG. 4 is a flowchart illustrating an method 400 of validating a document instance in accordance with one embodiment of the present invention. At step 402 a document instance can be received as an input. The document instance can be an instance of an XML document. In one arrangement, the document instance can be an instance of an XML message that is configured to be communicated via the Internet Protocol (IP).

At step 404, each element in the document instance can be parsed from the document instance. At step 406, a first validation of each element can be performed using a schema parse tree, for example a schema parse tree generated in accordance with the method 200 of FIG. 2. Specifically, each element can be validated against a corresponding node of the schema parse tree. At step 408, a second validation of at least one of the parsed elements can be performed. In illustration, the schema parse tree node corresponding to the parsed element can include syntax to call a user defined validation rule corresponding to the element. The user defined validation rule can be called and the element can be validated against the user defined validation rule.

At step 410, the validated document elements can be added to a validation report. The validation report can indicate any of the validated document elements that do not conform to the schema parse tree and/or the user defined validation rules. At step 412, the validation report can be output.

Figure 5:
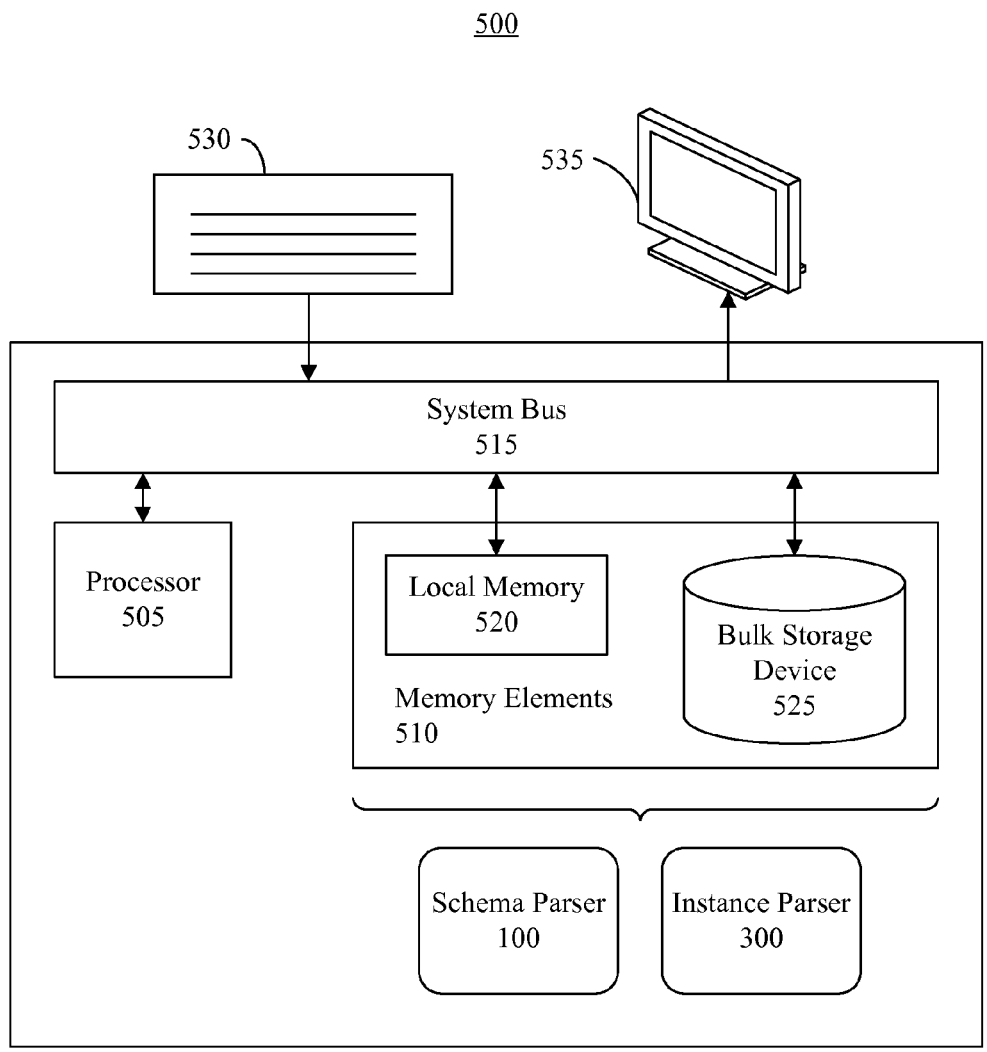
FIG. 5 is a block diagram illustrating a system that validates schema and documents in accordance with one embodiment of the present invention.

FIG. 5 is a block diagram illustrating a system 500 that validates schema and documents in accordance with one embodiment of the present invention. The system 500 can include at least one processor 505 coupled to memory elements 510 through a system bus 515. As such, the system 500 can store program code within memory elements 510. The processor 505 can execute the program code accessed from the memory elements 510 via the system bus 515. In one aspect, for example, the system 500 can be implemented as computer that is suitable for storing and/or executing program code. It should be appreciated, however, that the system 500 can be implemented in the form of any system comprising a processor and memory that is capable of performing the functions described within this specification.

The memory elements 510 can include one or more physical memory devices such as, for example, local memory 520 and one or more bulk storage devices 525. Local memory 520 refers to random access memory or other non-persistent memory device(s) generally used during actual execution of the program code. Bulk storage device(s) 525 can be implemented as a hard drive, a solid state drive (SSD), flash memory, or another suitable persistent data storage device. The system 500 also can include one or more cache memories (not shown) that provide temporary storage of at least some program code in order to reduce the number of times program code must be retrieved from bulk storage device 525 during execution.

Input/output (I/O) devices such as a keyboard 530, a display 535, and a pointing device (not shown) optionally can be coupled to the system 500. The I/O devices can be coupled to the system 500 either directly or through intervening I/O controllers. Network adapters (not shown) also can be coupled to the system 500 to enable the system 500 to become coupled to other systems, computer systems, remote printers, and/or remote storage devices through intervening private or public networks. Modems, cable modems, and Ethernet cards are examples of different types of network adapters that can be used with the system 500.

As pictured in FIG. 1, the memory elements 510 can store the schema parser 100 and the instance parser 300. As noted, certain modules, such as the core parser and element validator can be shared among the schema parser 100 and the instance parser 300, and can be stored within the memory elements 510. In operation, the schema parser 100 can receive schema, generate a schema parse tree, and output the schema parse tree, as described herein. Further, the instance parser can receive a document instance, validate the document instance against the schema parse tree and against user validation rules, generate a validation report, and output the validation report. As used herein, "outputting" and/or "output" can mean storing in memory elements 510, for example, writing to a file stored in memory elements 510, writing to the display 535 or other peripheral output device, playing audible notifications, sending or transmitting to another system, exporting, or the like.

In one embodiment, the schema parser 100 and instance parser 300 can be implemented as IBM® Rational® Project Conductor™ (IBM, Rational and Project Conductor are trademarks of International Business Machines Corporation in the United States, other countries, or both).

Like numbers have been used to refer to the same items throughout this specification. The flowcharts and block diagrams in the Figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. Within a system comprising a processor and a memory, a method comprising:
   via the processor, receiving a schema as an input;
   for at least one element in the schema:
      parsing the element from the schema;
      validating the parsed element by comparing the parsed element to a node within a first schema parse tree that is static;

generating a parse tree node for the parsed element, the parse tree node configured to call at least one user defined validation rule, external to a second schema parse tree, which validates an element of a document corresponding to the parse tree node; and adding the parse tree node to the second schema parse tree; and outputting the second schema parse tree.

2. The method of claim 1, further comprising prompting the user to define the at least one user defined validation rule.

3. The method of claim 1, wherein the at least one user defined validation rule implements business logic.

4. The method of claim 1, wherein the first schema parse tree that is static comprises only nodes that together define a sub-set of known schema, the sub-set of known schema corresponding to schema used by a particular application.

5. The method of claim 1, further comprising validating a document instance using the second schema parse tree.

6. The method of claim 5, wherein validating the document instance using the second schema parse tree comprises:

validating each element of the document instance against a corresponding node of the second schema parse tree.

7. The method of claim 6, wherein validating the document instance using the second schema parse tree further comprises:

validating at least one element of the document instance using a user defined validation rule.

8. The method of claim 7, wherein the corresponding node of the second schema parse tree comprises syntax that calls the user defined validation rule.

9. Within a system comprising a processor and a memory, a method comprising:

via the processor, receive a document instance as an input;

for each element in the document instance:

parsing the element from the document instance; and performing a first validation of each parsed element using a second schema parse tree, wherein the schema parse tree is generated from at least one schema that describes a document structure, schema elements parsed from the at least one schema are validated using a first schema parse tree that is static, the second schema parse tree includes nodes for respective types of document elements expected to be encountered and that correspond to the schema elements parsed from the at least one schema and validated using the first schema parse tree that is static, and at least one of the nodes is configured to call at least one user defined validation rule, external to the schema parse tree, which validates the element of the document instance corresponding to the node;

performing a second validation of at least one parsed element using the at least one user defined validation rule external to the second schema parse tree called from the node to which the parsed element corresponds;

adding the validated document elements to a validation report; and outputting the validation report.

10. The method of claim 9, wherein performing the second validation comprises identifying syntax in the second schema parse tree that calls the at least one user defined validation rule.

11. The method of claim 9, wherein the at least one user defined validation rule implements business logic.

* * * * *